United States Patent [19]

Drouet et al.

[11] Patent Number: 5,104,830

[45] Date of Patent: Apr. 14, 1992

[54] COMPOSITE SHAPED ARTICLES COMPRISING REINFORCED GLASS-CERAMIC MATRICES

[75] Inventors: Claudette Drouet, Juillan; Paul Goursat, Verneuil-Sur-Vienne; Bernard Lengronne, Montsegur; Christophe Seraudie, Meyssac, all of France

[73] Assignee: Ceramiques Et Composites, Courbevoie, France

[21] Appl. No.: 540,167

[22] Filed: Jun. 19, 1990

[30] Foreign Application Priority Data

Jun. 21, 1989 [FR] France .................. 89 08260

[51] Int. Cl.$^5$ .............................. C03C 10/08
[52] U.S. Cl. ............................. 501/9; 501/32; 501/64; 501/69; 501/95; 264/65
[58] Field of Search ........... 501/69, 64, 32, 9, 95; 264/65

[56] References Cited

U.S. PATENT DOCUMENTS

| | | | |
|---|---|---|---|
| 4,097,295 | 6/1978 | Chyung et al. | 501/9 X |
| 4,412,854 | 11/1983 | Layden | 501/95 X |
| 4,485,179 | 11/1984 | Brennan et al. | 501/95 X |
| 4,615,987 | 10/1986 | Chyung et al. | 501/95 X |
| 4,794,094 | 12/1988 | Makishima et al. | 501/5 |

FOREIGN PATENT DOCUMENTS 0288199 10/1988 European Pat. Off. .
2538370 6/1984 France .

*Primary Examiner*—Karl Group
*Attorney, Agent, or Firm*—Burns, Doane, Swecker & Mathis

[57] ABSTRACT

Composite shaped articles, well adapted for aerospace applications, include a glass-ceramic and an effective amount of a reinforcing agent therefor, preferably a fibrous and ceramic reinforcing agent, such glass-ceramic matrix being based on silica, alumina, an alkaline earth metal oxide and a rare earth oxide, in the following proportions by weight relative to the total weight of the matrix:

$$5\% \leqq MO \leqq 40\%$$

$$25\% \leqq SiO_2 \leqq 70\%$$

$$15\% \leqq Al_2O_3 \leqq 70\%$$

$$5\% \leqq \text{rare earth oxide} \leqq 70\%$$

wherein M represents an alkaline earth metal.

17 Claims, No Drawings

COMPOSITE SHAPED ARTICLES COMPRISING REINFORCED GLASS-CERAMIC MATRICES

BACKGROUND OF THE INVENTION

1. Field of the Invention

The present invention relates to novel composite materials comprising a reinforced glass-ceramic (hereafter "vitroceramic") matrix, and to a process for the production thereof.

2. Description of the Prior Art

Composite materials comprising a vitroceramic matrix and, in particular, a reinforcing amount of fibers, are currently of great technical interest in light of their good thermomechanical properties For this reason, they may advantageously be used in the aeronautical and aerospace fields for applications requiring good strength at intermediate temperatures, i.e., on the order of 600° to 1,000° C.

However, most of the materials of this type developed to date are not completely satisfactory, both relative to their final properties and to the processing thereof.

Among the most widely used and best performing composite materials comprising vitroceramic matrices are those having a matrix which is based on lithium. But matrices of this type display a resistance to corrosion that is not entirely satisfactory.

The technique most typically employed for the production of such materials entails impregnating a fiber preform (reinforcing agent) with a slip containing, in various forms, all of the constituents required to provide the desired vitreous composition, then drying the thus impregnated preform.

The stages of impregnating and drying may be repeated until a prepreg is obtained having the desired amount by volume of fibrous reinforcement and/or a plurality of prepregs is stacked into an array and made integral by heating the dried prepregs at moderate temperatures in order to produce large size mono- or bidirectionally reinforced composites. Finally, the preform is densified in a compression stage at elevated temperatures. This latter stage, having in particular the purpose of making the glass flow through the strands of the preform, requires a relatively low viscosity of the glass (less than $10^7$ poises) and thus a high compression temperature.

Hence, to obtain suitable results relative to density and thermomechanical properties, it is known that glasses based on lithium must be compressed at temperatures of at least about 1,300° to 1,400° C. These high pressing temperatures entail the risk of damaging the fibers which constitute the reinforcing structure.

SUMMARY OF THE INVENTION

Accordingly, a major object of the present invention is the provision of novel composite materials comprising reinforced vitroceramic matrices, which novel composites are consolidated at lower temperatures than the hot pressing temperatures of the prior art.

Another object of the present invention is the provision of novel composite materials having improved corrosion resistance.

Briefly, the present invention features novel composite materials comprising a vitroceramic matrix and a reinforcing agent therefor, and wherein such vitroceramic matrix is based on silica, alumina, and alkaline earth and rare earth oxides, in the following weight proportions relative to the total weight of the matrix:

$5\% \leq MO \leq 40\%$ $25\% \leq SiO_2 \leq 70\%$ $15\% \leq Al_2O_3 \leq 70\%$ $5\% \leq$ rare earth oxides $\leq 70\%$ in which M represents an alkaline earth metal.

This invention also features a process for the preparation of the above novel composite materials, comprising:

(a) impregnating the reinforcing agent with a slip containing the constituents constituting the vitroceramic matrix;

(b) drying the thus impregnated reinforcing agent to provide a prepreg;

(c) compressing the resulting prepreg; and (d) heat-treating the compressed prepreg thus produced.

DETAILED DESCRIPTION OF THE PREFERRED EMBODIMENTS OF THE INVENTION

More particularly according to the present invention, the subject novel composites are especially desirable in that they require application temperatures of less than 1,200° C.

Such novel composites also exhibit good mechanical properties at elevated temperatures.

As indicated above, the vitroceramic matrix of the composite materials according to the invention is based on silica $(SiO_2)$, alumina $(Al_2O_3)$, and the alkaline earth metal and rare earth oxides.

As regards the alkaline earth metal oxides, calcium, barium, strontium and magnesium oxides are typically used, with the latter being the preferred, as these permit the recrystallization of a phase having a low coefficient of expansion and a dilatometric characteristic close to that of the reinforcing agent.

As utilized herein, by the term "rare earths" are intended the rare earth elements designated the lanthanides, having atomic numbers of from 57 to 71, but also including yttriusm Among these elements, in particular cerium, lanthanum, neodymium, praseodymium and samarium are used, with cerium and lanthanum being the preferred, as well as yttrium.

The contents of the rare earth oxides indicated above and in the description which follows are calculated for the most common oxide of the rare earth (RE) under consideration, i.e., typically $RE_2O_3$ or $REO_2$, in particular for cerium.

It should be appreciated that both for the alkaline earths and for the rare earths, each of the elements may be used alone or in combination with another element of the same group. This applies to the totality of the present description, with the understanding that any reference to an alkaline earth or a rare earth is also applicable to a combination of several alkaline earths or rare earths.

The constituents constituting the matrix of the composites of the invention are present in the proportions indicated above, i.e.:

$5\% \leq MO \leq 40\%$ $$25\% \leq SiO_2 \leq 70\%$$

$$15\% \leq Al_2O_3 \leq 70\%$$

$$5\% \leq \text{rare earth oxides} \leq 70\%.$$

In a preferred embodiment of the invention, the respective proportions of these constituents are the following:

$$6.5\% \leq MO \leq 18\%$$

$$25\% \leq SiO_2 \leq 50\%$$

$$17.5\% \leq Al_2O_3 \leq 62.50\%$$

$$5\% \leq \text{rare earth oxides} \leq 50\%.$$

In another preferred embodiment of the invention, these proportions are:

$$7\% \leq Mo \leq 11\%$$

$$28\% \leq SiO_2 \leq 40\%$$

$$20\% \leq Al_2O_3 \leq 45\%$$

$$10\% \leq \text{rare earth oxides} \leq 40\%.$$

The composite materials of the invention also comprise a fibrous reinforcing agent.

In general, fibrous ceramic reinforcing agents are used which comprise an organized or random assembly of long and continuous ceramic fibers (filaments). Such fibers may be incorporated into the matrix in a unidirectional configuration, or in the form of a fabric or nonwoven mat, or also in a multidirectional configuration.

The reinforcing agent may also comprise short fibers and/or whiskers, oriented in a random fashion within the matrix.

Continuous filaments in combination with and/or short fibers may also be used as the reinforcing agents, well dispersed within the matrix.

From the point of view of mechanical strength, the preferred composite materials according to the invention are those comprising unidirectional fiber reinforcements, i.e., fibers that are substantially parallel to each other and oriented in the same and only direction (Composite 1D), or bidirectional fiber reinforcements, i e., fibers that are substantially parallel to each other, but in crossed directions in two successive horizontal planes, with the crossing angle advantageously being equal to 90°, to provide the best mechanical properties (Composite 2D).

Exemplary ceramic fibers which are suitable reinforcing agents are, in particular, carbon, boron, alumina, alumina/silica, alumina/silica/boron, silicon carbide, silicon nitride, boron nitride and silicon carbonitride fibers. Obviously, mixtures of fibers of different ceramics may also be used as suitable reinforcing agents.

Silicon carbide ceramic fibers are especially suitable to produce composites having high thermomechanical strengths.

The amount by volume of the reinforcing agent in the composite materials of this invention advantageously ranges from 20% to 70%, preferably from 30% to 50%.

The process for the preparation of the composite materials according to the present invention will now be more fully described.

The process comprises a plurality of stages.

The first stage entails impregnating the reinforcing agent (unidirectional fibers, fabrics, nonwoven mats, multidirectional preforms, etc.,) using a slip containing the constituents constituting the vitroceramic matrix.

The impregnating slip thus contains, in a finely dispersed form, the elements of silicon, aluminum, alkaline earth and rare earths in the respective weight proportions expressed as the oxides thereof, in the quantities indicated above, with all of such elements being present, after hot pressing, in the ceramic matrices of the subject composites.

These elements are in the form of a molten mass, previously obtained by mixing together and melting either the oxides of the particular elements or the precursors of these elements in the form of naturally occurring materials.

Thus, CaO may be provided by calcium silicate (Wollastonite), calcium carbonate (Aragonite, Calcite), or by calcic Feldspath (Anorthite).

MgO may be introduced by means of magnesium silicate (Steatite, Forsterite, Saphirine), magnesium aluminate (Spinel), a magnesium hydrate (Brucite) or magnesium carbonate (Magnesite).

The CaO and MgO may also be introduced together, using a double calcium and magnesium carbonate (Dolomite) or a double silicate of these elements (Diopside).

The $SiO_2$ and $Al_2O_3$ may be provided together by kaolin, cyanate, sillimanite, clay, or separately by quartz or an alumina hydrate (hydrargillite, boehmite).

Finally, $SiO_2$, $Al_2O_3$ and MgO may be introduced together using cordierite.

The grain size of the powders constituting the ceramic charge of the slip is advantageously less than 50 μm and preferably less than 10 μm.

The rheological properties and the wettability of the slip are adjusted conventionally by the addition of binders and solvents of appropriate nature and in the proper proportions. The solvents are eliminated during the drying stage.

In a second stage, the reinforcing agent impregnated in the preceding stage is dried.

The stages of impregnation and drying may be repeated until a prepreg having the desired amount by volume of the reinforcing agent is produced.

In one embodiment of the subject process, particularly suitable for the preparation of Composites 1D and 2D as described above, it is also possible to stack and bond (consolidate) identical prepregs in the form of sheet composites with unidirectional fiber reinforcements, the composites being stacked either by maintaining the direction of the fibers in parallel (Composite 1D) or crossing them (Composite 2D) in the superposed sheets.

The third stage of the process of the invention is that of compression and sintering.

It will be appreciated, however, that prior to the sintering under pressure of the impregnated and dried prepreg, it is preferable to eliminate, either partially or completely, the various binders used in the preparation of the slip. This operation, designated scouring, is conventionally carried out by a moderate heat treatment, in air or under a neutral atmosphere, of the preform.

The densification or sintering by heating is typically carried out at a temperature of at least 850° C., for example ranging from 850° to 1,200° C. and preferably ranging from 900° to 1,100° C.

In a preferred embodiment of the invention, the process is carried out under pressure.

This pressure is typically at least 3 MPa; advantageously, it ranges from 3 to 5 MPa to 25 MPa.

In a manner per se known to this art, it is preferable to carry out the densification or sintering treatment in a neutral atmosphere.

The duration of the densification treatment is preferably at least 15 min and may extend up to 3 hours, for example.

The last stage of the process is a heat or recrystallization treatment. This stage makes it possible to develop the crystalline structure in the amorphous matrix produced in the preceding stages.

This treatment is carried out at a temperature of at least 1,000° C., preferably ranging from 1,000° to 1,200° C.

It is generally carried out without pressure. Its duration is up to several hours, for example from 0.5 to 6 hours.

In order to further illustrate the present invention and the advantages thereof, the following specific examples are given, it being understood that same are intended only as illustrative and in nowise limitative.

EXAMPLE 1

In this example, different initial compositions based on natural raw materials were used.

The constituents are indicated in weight %.

These compositions, when molten, were formulated into slips and converted into the matrices according to the invention.

| Elements | Compositions | | | | | |
|---|---|---|---|---|---|---|
| | 1 | 2 | 3 | 4 | 5 | 6 |
| Cordierite | 70 | 60 | 50 | 60 | 60 | 50 |
| Alumina | 10 | 10 | — | — | 20 | — |
| $Y_2O_3$ | 20 | 30 | 20 | 40 | 20 | 5 |
| Steatite | — | — | 30 | — | 0 | 45 |

The contents of the different elements of the subject compositions are reported as the oxides thereof:

| Elements | Compositions | | | | | |
|---|---|---|---|---|---|---|
| | 1 | 2 | 3 | 4 | 5 | 6 |
| MgO | 9.7 | 8.3 | 17.6 | 8.3 | 8.3 | 22.9 |
| $SiO_2$ | 35.8 | 30.7 | 44.7 | 30.7 | 30.7 | 54.2 |
| $Al_2O_3$ | 34.5 | 31.0 | 17.7 | 21 | 41 | 17.8 |
| $Y_2O_3$ | 20.0 | 30.0 | 20.0 | 40.0 | 20.0 | 5.0 |

EXAMPLE 2

This example describes the preparation of a composite material according to the invention. The glass was synthesized by the fusion of Composition 1, in air, at 1,500° C. The molten mass obtained in this manner was ground until a powder was produced having grain diameters of less than 10 μm. An impregnating slip was prepared from this powder and the following composition:

| (i) Preground glass (Composition 1): | 10.3 kg |
|---|---|
| (ii) Polystyrene: | 0.87 kg |
| (iii) Paraffin: | 0.21 kg |
| (iv) Dioctylphthalate: | 0.36 kg |
| (v) Cyclohexane: | 10.6 liters. |

The slip was introduced into an 10 l alumina grinder with 50 kg of alumina pellets. Grinding was continued for 15 hours.

SiC fibers were then impregnated with this slip. Sheets were wound on a polygonal mandrel. The alps were cut and a stack was established at 0° C.

The material was scoured and subsequently sintered in a neutral atmosphere at 900° C., under a pressure of 5 MPa for 2 hours.

A recrystallization treatment was lastly carried out at 1,100° C. for 5 hours without pressure.

The properties of the composite material $P_1$ according to the invention produced in this manner are reported in the following Table, wherein the properties of a material $P_2$ of the prior art, having the following composition, are also reported.

| $SiO_2$: | 69.6% | $Li_2O$: | 3.0% |
|---|---|---|---|
| $Al_2O_3$: | 17.7% | $ZrO_2$: | 2.0% |
| MgO: | 2.7% | $Nb_2O_5$: | 3.0% |
| BaO: | 1.0% | $AS_2O_3$: | 1.0% |

| | $P_1$ | $P_2$ |
|---|---|---|
| Hot working temperature | 900° C. | 1,400° C. |
| Density | 2.61 | 2.5 |
| Volume fraction of fiber | 40 | 50 |
| 3 Point bending at temperature, MPa | | |
| 20° C. | 470 | 600 |
| 1,200° C. | 400 | 300 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composite shaped article comprising a glass-ceramic matrix and a fibrous reinforcing agent therefor, said glass-ceramic matrix including silica, alumina, an alkaline earth metal oxide and a rare earth oxide, in the following proportions by weight relative to the total weight of such matrix:

$5\% \leq MO \leq 40\%$ $25\% \leq SiO_2 \leq 70\%$ $15\% \leq Al_2O_3 \leq 70\%$ $5\% \leq \text{rare earth oxides} \leq 70\%$ wherein M represents an alkaline earth metal.

2. The composite shaped article as defined by claim 1, said glass-ceramic matrix having the following composition:

$6.5\% \leq MO \leq 18\%$ $25\% \leq SiO_2 \leq 50\%$ $17.5\% \leq Al_2O_3 \leq 62.5\%$ $5\% \leq$ rare earth oxides $\leq 50\%$.

3. The composite shaped article as defined by claim 1, said glass-ceramic matrix having the following composition:

$7\% \leq MO \leq 11\%$ $28\% \leq SiO_2 \leq 40\%$ $20\% \leq Al_2O_3 \leq 45\%$ $10\% \leq$ rare earth oxides $\leq 40\%$.

4. The composite shaped article as defined by claim 1, wherein said glass-ceramic matrix M comprises magnesium.

5. The composite shaped article as defined by claim 1, wherein the rare earth of said glass-ceramic matrix comprises at least one element selected from the group consisting of yttrium, cerium and lanthanum.

6. The composite shaped article as defined by claim 1, said reinforcing agent comprising fibers selected from the group consisting of long filaments, and whiskers.

7. The composite shaped article as defined by claim 6, said fibrous material comprising ceramic fibers.

8. The composite shaped article as defined by claim 7, said ceramic fibers comprising at least one fiber selected from the group consisting of carbon, boron, alumina, alumina/silica, alumina/silica/boron, silicon carbide, silicon nitride, boron nitride and silicon carbo-nitride fibers.

9. The composite shaped article as defined by claim 1, comprising an amount by volume of said reinforcing agent ranging from 20% to 70%.

10. The composite shaped article as defined by claim 9, said amount by volume ranging from 30% to 50%.

11. A process for the preparation of a composite shaped article comprising a glass-ceramic matrix and a fibrous reinforcing agent therefor, said glass-ceramic matrix including silica, alumina, an alkaline earth metal oxide and a rare earth oxide, in the following proportions by weight relative to the total weight of such matrix:

$5\% \leq MO \leq 40\%$ $25\% \leq SiO_2 \leq 70\%$ $15\% \leq Al_2O_3 \leq 70\%$ $5\% \leq$ rare earth oxides $\leq 70\%$ wherein M represents an alkaline earth metal, comprising (a) impregnating the reinforcing agent with a slip containing the compounds constituting said glass-ceramic matrix; (b) drying the thus impregnated reinforcing agent to produce a prepreg therefrom; (c) densifying said prepreg; and (d) heat-treating such densified prepreg.

12. The process as defined by claim 11, comprising densifying said prepreg by heating at a temperature of at least 850° C.

13. The process as defined by claim 12, comprising densifying said prepreg at a temperature of at least 1,000° C.

14. The process as defined by claim 11, comprising densifying said prepreg under heat and pressure.

15. The composite shaped article as defined by claim 1, comprising a stacked array of reinforced glass-ceramic matrices.

16. The composite shaped article as defined by claim 1, comprising a unidirectionally reinforced glass-ceramic matrix.

17. The composite shaped article as defined by claim 1, comprising a polydirectionally reinforced glass-ceramic matrix.

* * * * *